Figure 1:
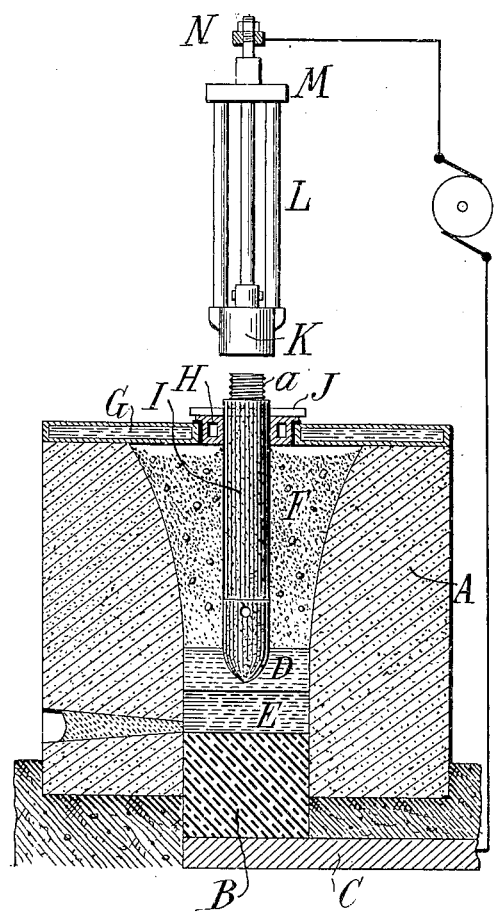

G. O. SEWARD & F. VON KÜGELGEN.
ELECTRIC FURNACE PROCESS.
APPLICATION FILED FEB. 21, 1906.

898,691.                                   Patented Sept. 15, 1908.

WITNESSES:

INVENTORS:
George O. Seward & Franz Von Kügelgen,
By Attorneys,

UNITED STATES PATENT OFFICE.

GEORGE O. SEWARD AND FRANZ VON KÜGELGEN, OF HOLCOMBS ROCK, VIRGINIA, ASSIGNORS, BY MESNE ASSIGNMENTS, TO ELECTRO METALLURGICAL COMPANY, A CORPORATION OF WEST VIRGINIA.

ELECTRIC-FURNACE PROCESS.

No. 898,691.　　　Specification of Letters Patent.　　　Patented Sept. 15, 1908.

Application filed February 21, 1906. Serial No. 302,232.

*To all whom it may concern:*

Be it known that we, GEORGE O. SEWARD, a citizen of the United States, and FRANZ VON KÜGELGEN, a subject of the German Emperor, both residing at Holcombs Rock, in the county of Bedford and State of Virginia, have jointly invented certain new and useful Improvements in Electric-Furnace Processes, of which the following is a specification.
This invention relates to a process of performing electric smelting or other smelting operations by means of an electric furnace.

In the production of that class of metals of which ferro-chrome may be considered representative, it is customary to feed a charge consisting of a more or less intimate mixture of the ore, carbon, and a flux into an electric furnace, feeding the charge at such a rate that only a shallow layer of unfused mixture floats upon the molten bath. In such mode of operation much heat is lost by radiation from the zone of reduction through the charge, while the electrode is insufficiently protected from oxidation by the air above the charge, and becomes reduced in size before entering the charge. The efficiency of the furnace is small, and regularity of operation is difficult.

It has often been proposed to keep such a deep layer of the mixture above the zone of reduction that the heat is kept in, and the ascending gases preheat to some extent the descending charge, but the extent to which this has been accomplished hitherto is inconsiderable. It has not been found practical to maintain a deep layer of mixture above the molten bath on account of the extreme difficulty of regaining the arc after replacing a used-up electrode with a new one, the mixture invariably falling into the cavity left by the withdrawal of the old pencil from the furnace and closing it. Particularly is it difficult if the layer of mixture is very deep, as it should be to get the best efficiency and to protect the pencil from oxidation above the charge. It has been proposed to nearly empty the furnace or reduce the level of the mixture preliminary to changing a pencil, but there are obvious practical reasons for not adopting such procedure.

The object of the present invention is to enable the production of ferro-chromium and similar alloys to be effected by a continuous process in which the furnace is kept full of mixture to such a depth that the heat losses are a minimum and the pencils are cool where they emerge from the mixture, and, therefore, are not burned by the air.

Our invention provides for renewing the electrode in such a way that there is formed no cavity in the charge, thus avoiding entirely the difficulty in regaining the arc which has hitherto prevailed. We accomplish this by leaving the electrode buried in the mixture, removing the holder therefrom when it has reached as low a point as convenient, attaching a new length to the electrode, connecting the holder to the upper end of the new length, and proceeding with the smelting process. A progressive feeding of the electrode into the furnace is thus effected and the charge above the molten bath is maintained in as deep a layer as desired. When the mixture is properly proportioned, the operation is almost automatic, and the furnace needs no stoking and simply is kept full of the charge, and the metal and slag tapped when necessary.

Graphite pencils are preferably used, on account of their greater conductivity and the ease with which they are machined, and care is taken that a good electrical and mechanical connection is assured in each joint. Preferably the lengths are united by screw-joints.

Figure 2:
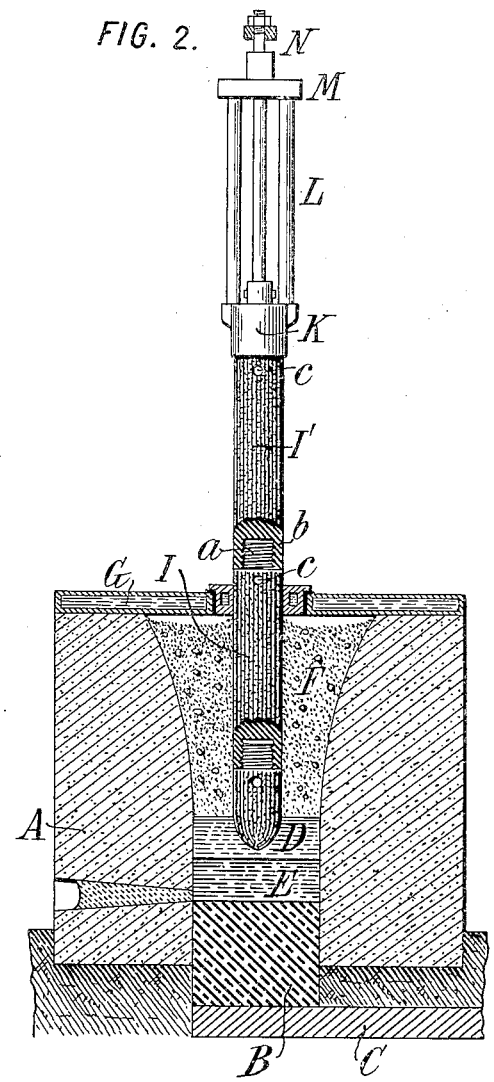

In the accompanying drawings,—Figure 1 is a vertical section of a suitable electric furnace, showing the condition when the electrode has become as short as convenient and the holder has been removed from it preparatory to attaching a new length. Fig. 2 is a similar section thereof, showing the new length of electrode screwed on and attached to the holder ready to proceed with the smelting process.

In the drawings, A designates the body of the furnace, which, for the production of ferro-chrome, will usually be made of chrome ore; B is the lower electrode, usually made of carbon; C is the lower electric terminal connecting with the bottom electrode; D is the layer of slag and molten charge; E is the layer of molten metal, and F is the granular or unfused charge which fills the furnace chamber.

G is the top of the furnace, which is preferably jacketed in order that it may be cooled by water circulation; H is an insulated water-cooled bushing surrounding the upper electrode.

I is the upper electrode, commonly and preferably made in the form of a pencil of carbon or graphite. This electrode is made in sections of suitable length adapted for attachment to one another in such manner as to form a firm mechanical connection, and to afford suitable conductivity for carrying the electric current. Preferably each section is formed with a screw-threaded projection $a$ at one end, and a screw-threaded socket $b$ at the other, so that successive sections may be screwed together, as clearly indicated in Fig. 2. Each section also has preferably a hole $c$ formed through it near its upper end through which to thrust a rod J, as shown in Fig. 1, to serve as a temporary support for the section and as a means for holding it while screwing on the next section.

K is the carbon holder connected by rods L with any suitable supporting head M which is hung from any suitable vertically adjustable support N. The particular construction of carbon holder is not essential, but it is preferable that it shall be adapted to engage the screw-threaded projection $a$, and to this end it may advantageously be constructed in the manner set forth in the application of George O. Seward for patent for carbon holders, filed May 3, 1904, Serial No. 206,250.

In operation, whenever the proper electrode or carbon pencil I becomes so short that the carbon holder K approaches inconveniently near to the top of the furnace, the smelting operation is suspended, a suitable rod J is thrust through the hole $c$ in the pencil, and the carbon holder and pencil are disconnected. The holder is then lifted, leaving the pencil supported by the rod J, as shown in Fig. 1. The holder is lifted high enough to enable another section of pencil I' to be applied as shown in Fig. 2. This section is screwed on to the one below, and the holder is then screwed on to the top of this section; the rod J is then removed and the furnace is ready to resume the smelting operation, being thus shown in Fig. 2.

Our invention is not limited to the construction of the electrode in sections which screw together, nor to the connection of the carbon holder by screwing it thereto. Any other suitable mode of connection of the sections to one another and to the carbon holder may be used. Nor is our invention limited to the use of the water-cooled top G or bushing H.

Though we have described with particularity the operation of our invention in a furnace having but one electrode, it is equally adapted to be used with furnaces containing two or more electrodes. When a multiplicity of pencils is used in the same furnace, as is desirable with a powerful furnace, the circuit to each pencil may be independently operated by a switch so that the current may be cut off from the pencil undergoing change and divided between the rest of the pencils, thus avoiding a reduction of the energy passing into the furnace or an interruption of the smelting operation. When convenient, the movable carbon holder may be replaced by a stationary form with which the pencil maintains a sliding contact, which has the advantage that new sections of pencil may be attached as desired without breaking the flow of current through the electrode.

The furnace shown in the drawing is what is commonly known as a "single pole" furnace, where the molten metal constitutes the other pole, but the invention is equally adapted to furnaces using pencils of opposite polarity, though a single-pole furnace with either one or a plurality of depending electrodes of the same polarity is better adapted to the purposes of electric smelting as described.

With a furnace of 1500 to 2000 horsepower, it is preferable that a plurality of electrodes be used, four eight-inch round pencils being very suitable, rather than one large electrode, for the reason that the gradual feeding down of the charge is greatly facilitated thereby.

Our invention, while it is applicable to the treatment of any refractory oxids or mixtures of oxids, or silicates, etc., is particularly adapted to the manufacture of ferrochromium, on account of the great refractoriness of the ore and its low conductivity at temperatures below its fusing point.

We are aware that it has been proposed to use horizontal sectional electrodes in an electric furnace wherein the electrodes enter an open space or chamber, and to apply new sections and feed the electrodes forward continuously as they are consumed; but such furnaces do not realize the object of our invention, since the electrodes are not buried in a mass of the granular material, and the advantages of a buried arc are not attained.

We claim as our invention:—

1. The process of operating an electric furnace, which consists in maintaining a deep layer of the charge into which the electrode projects and by which it is surrounded, so that the arc is buried beneath the charge, and effecting renewal of the electrode material by progressive feeding in of new lengths without withdrawal of the electrode from the charge.

2. The process of electric smelting, which consists in maintaining a deep layer of the charge above the molten bath and surrounding the lower part of an upright sectional electrode, so that the arc is buried beneath the charge, fusing the charge by a current from such electrode, and renewing the latter by successively attaching new sections thereof above the charge without withdrawing the electrode from the charge.

3. The process of electric smelting in an electric furnace wherein an arc is maintained between an upright electrode and the molten bath beneath, which consists in maintaining a deep layer of the charge of granulated material above the molten bath and surrounding the lower part of the electrode, so that the arc is buried beneath the charge, gradually feeding the electrode downward as it is consumed, and renewing the electrode by successively attaching thereto new sections thereof above the charge and without withdrawing the electrode nor so lifting it as to permit the granular charge to fall in beneath it and close the space normally occupied by the electrode.

In witness whereof, we have hereunto signed our names in the presence of two subscribing witnesses.

GEORGE O. SEWARD.
FRANZ VON KÜGELGEN.

Witnesses:
J. H. WEBB,
F. VON BIDDER.